June 28, 1932.  W. O. APPLEMAN ET AL  1,865,072
HAND REST FOR STEERING WHEELS
Filed June 6, 1931
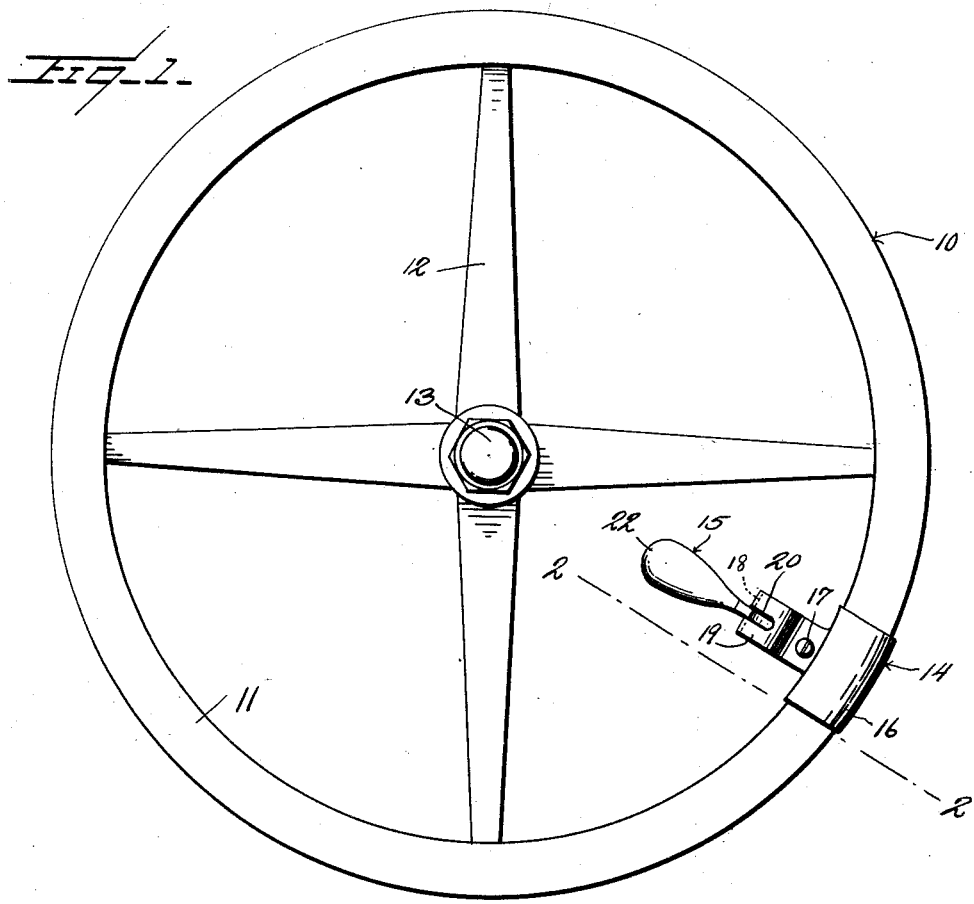
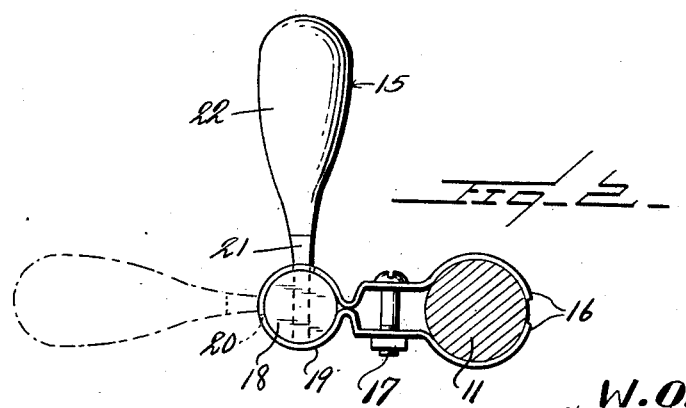
Inventors
W. O. Appleman
F. N. Bay
By Watson E. Coleman
Attorney Patented June 28, 1932

1,865,072

UNITED STATES PATENT OFFICE

WINFIELD O. APPLEMAN AND FRANK N. BAY, OF ALBIA, IOWA

HAND REST FOR STEERING WHEELS

Application filed June 6, 1931. Serial No. 542,644.

This invention relates to steering wheels for motor vehicles or the like, and more particularly to means for resting the hand or arm of the driver on the wheel.

An object of this invention is to provide an attachment which may be readily mounted on any steering wheel ring upon which the hand of the driver may rest so as to render long or continued driving of the vehicle more easy and to eliminate the necessity of grasping one of the spokes of the wheel as is usually done.

Another object of this invention is to provide a device of this kind which may be adjustably mounted at any point on the steering wheel ring on either the interior or exterior of the ring, the device being so constructed as not to interfere with the normal use of the wheel.

The above and various other objects and advantages of this invention will in part be described in and in part be understood from the following detailed description of the present preferred embodiment, the same being illustrated in the accompanying drawing, wherein:—

Figure 1 is a detail top plan view of a steering wheel having a device constructed according to the preferred embodiment of this invention, mounted thereon and Figure 2 is a sectional view of the wheel taken on the line 2—2 of Figure 1, showing in side elevation the device and in dotted lines one of the positions in which the device may be disposed while on the wheel.

Referring to the drawing wherein like numerals of reference designate corresponding parts throughout the several views, the numeral 10 designates generally a steering wheel having a ring or annulus 11 provided with spokes 12 radiating from the central portion 13 thereof.

In the use of steering wheels at present available, during the driving of the vehicle, it is usually more convenient in long driving for the driver to rest one hand on one of the spokes 12 of the vehicle rather than to grasp the annulus or ring 11. It frequently happens that the spoke 12, which it is desired to grasp for resting of one hand, is disposed at a point where the arm must be held relatively straight in order to grasp the spoke or, in any event, the spoke is positioned at a point where it is not convenient to readily hold the spoke or rest the hand thereupon and it is, therefore, necessary to grasp the ring 12 with both hands which in long or continuous driving is somewhat tedious.

In order to provide means whereby one hand of the driver may rest on a member disposed within the ring 12, we have provided a hand rest or holding member which comprises a clamping body, generally designated as 14, and a hand holding member, generally designated as 15, which is adjustably supported by the clamp 14. This clamp 14 comprises a pair of clamping arms 16 which are adapted to engage about the periphery of the ring or annulus 11 and which may be tightened thereabout by means of a bolt or tightening element 17.

A shaft 18 is disposed within a loop 19 formed integrally with the clamping arms 16 and disposed on the inner side of the clamping arms 16, this tubular member 19 being adapted to frictionally engage about the periphery of the shaft 18 when the securing element 17 is tightened for tightening of the clamping arms 16 about the periphery of the ring 11. The tubular member 19 is provided intermediate its ends with a segmental slot 20 through which a shank 21 is adapted to project, this shank 21 being secured to the shaft 18 in substantially radial relation thereto. This shank 21 terminates in a handle or rest member 22, which may be adjusted angularly with respect to the longitudinal axis of the clamping arms 16 to the limits of the slot 20. Preferably, the hand grasping or resting member 22 may be adjusted from a position in alinement with the clamping arms 16 and in radial relation to the center 13 of the steering wheel to a position at substantially right angles thereto.

In the use of this device, the clamping arms 16 may be spread open to a sufficient extent so as to permit the arms to pass over the periphery of the ring 11, whereupon the tightening element 17 may be tightened so that the clamping member 14 will be securely held on the ring 11. If desired, the clamp 14 may be so positioned as to extend inwardly of the outer circle of the ring 11. This device is preferably disposed on the steering wheel at a point where one hand of the driver may readily rest on or grasp the handle portion 15 when the vehicle is moving in a relatively straight line, but we, of course, do not wish to be limited to any particular position as the device herein disclosed may be mounted at any point about the ring 11.

It is, of course, understood that various changes and modifications may be made in the details of construction and design of the above specifically described embodiment of this invention without departing from the spirit thereof, such changes and modifications being restricted only by the scope of the following claims.

We claim:—

1. As a new article of manufacture, a hand rest of the character described comprising a pair of clamping arms integrally formed with each other and having a looped inner end portion, means for securing the arms in adjusted position on a steering wheel rim, a shaft rotatably disposed within the looped inner end portion of said arms, and a hand rest member carried by said shaft transversely of the longitudinal axis thereof.

2. As a new article of manufacture, a hand rest of the character described comprising a pair of clamping arms integrally formed with each other and having a looped inner end portion, means for securing said arms in adjusted position on the rim of a wheel, said looped inner end portion having an elongated slot therein, a shaft disposed within the looped end portion of said arms, and a rest member secured to said shaft and extending outwardly through said slotted portion, said rest member being adjustable in said slot with respect to said clamping arms.

In testimony whereof we hereunto affix our signatures.

WINFIELD O. APPLEMAN.
FRANK N. BAY.